Nov. 8, 1932.  V. J. CHAPMAN  1,886,643
AUTOMATIC ARC WELDING APPARATUS
Original Filed Sept. 4, 1930   2 Sheets-Sheet 1
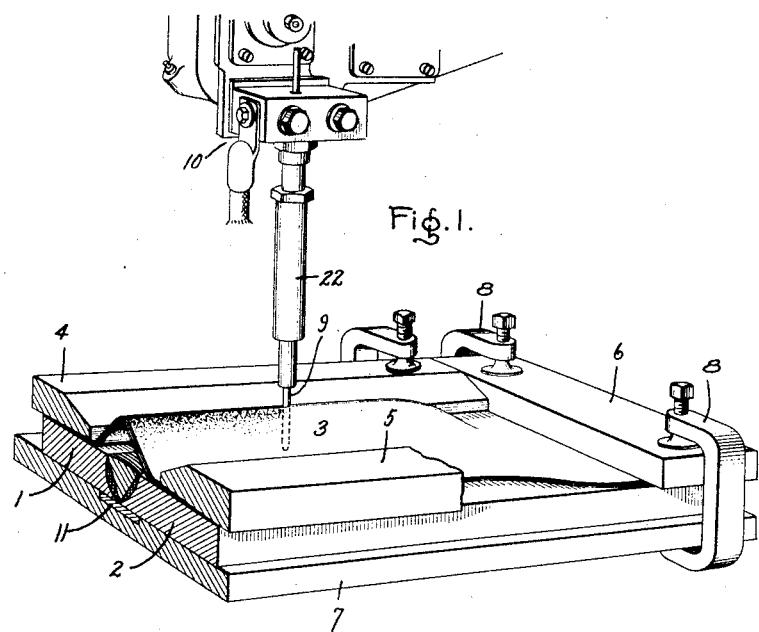
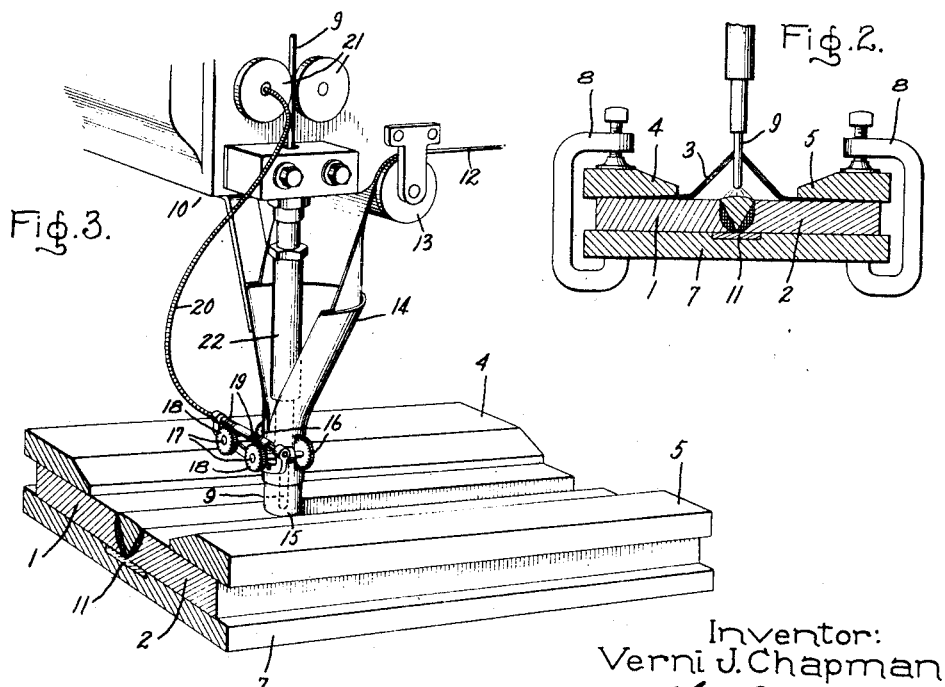
Inventor:
Verni J. Chapman,
by Charles E. Tuller
His Attorney.

Nov. 8, 1932.   V. J. CHAPMAN   1,886,643
AUTOMATIC ARC WELDING APPARATUS
Original Filed Sept. 4, 1930   2 Sheets-Sheet 2
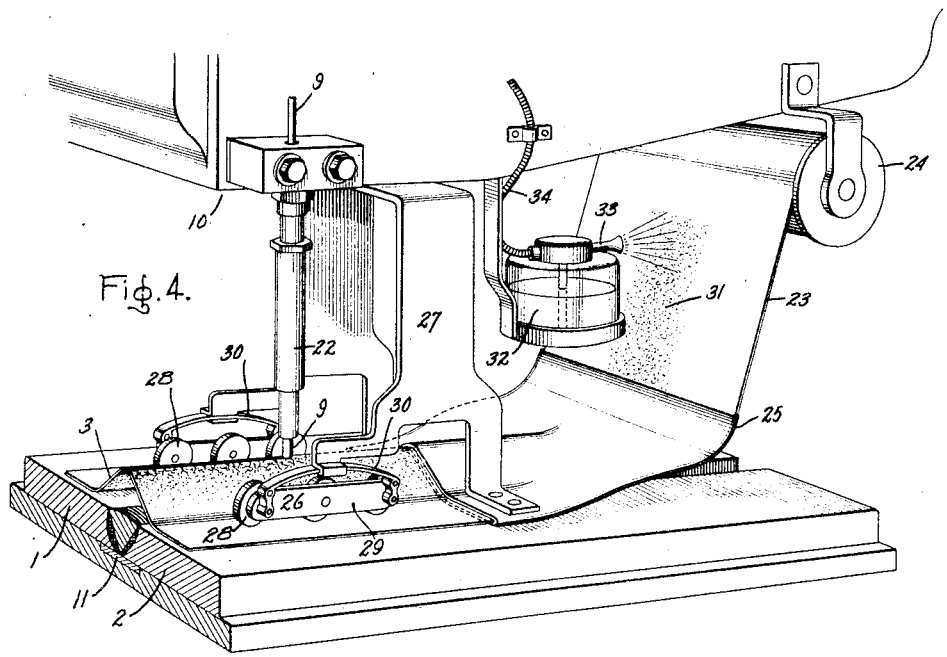
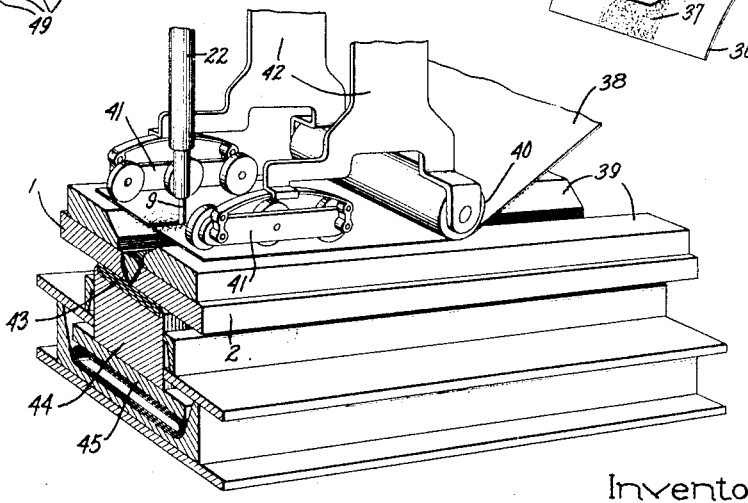
Inventor:
Verni J. Chapman,
by Charles E. Mullen
His Attorney.

Patented Nov. 8, 1932

1,886,643

UNITED STATES PATENT OFFICE

VERNI J. CHAPMAN, OF SCHENECTADY, NEW YORK, ASSIGNOR TO GENERAL ELECTRIC COMPANY, A CORPORATION OF NEW YORK

AUTOMATIC ARC WELDING APPARATUS

Application filed September 4, 1930, Serial No. 479,719. Renewed April 30, 1932.

My invention relates to arc welding, and more particularly to that form of welding in which the arc and molten portions of the work adjacent thereto are protected during the welding operation from the surrounding atmosphere through the agency of a shield.

An object of my invention is to provide means for automatically feeding a sheet of shielding material in spaced relation to the welding arc to form an enclosure about it and the molten portions of the weld metal adjacent thereto.

Further objects of my invention will become apparent from the following description taken in connection with the accompanying drawings and its scope will be pointed out in the appended claims.

In the drawings Figs. 1 and 2 illustrate a method of welding for which my invention is particularly suited. Fig. 3 shows one embodiment of the invention in which the sheet of shielding material is fed as a tube about the welding electrode and the arc into engagement with the work parts to form an enclosure about the arc. Fig. 4 illustrates another embodiment of my invention in which a sheet of shielding material is folded into a shield the central portion of which is spaced from the work parts to form an enclosure within which to perform the welding operation. In the embodiment shown in this figure means are also provided for applying a fluxing material to the sheet of shielding material to improve the welding operation. Fig. 5 shows a roll of shielding material in which a welding flux is enclosed between the layers of material constituting the sheet. Fig. 6 shows an arrangement embodying my invention, in which the sheet of shielding material is applied to two clamping members extending along the seam to be welded with which it forms the enclosure within which the welding operation is performed. Fig. 7 illustrates a modification of the holding members shown in Figs. 4 and 6 in which a plurality of springs are used for holding the shielding member in engagement with the work instead of the rollers illustrated in those figures.

The assembly shown in Figs. 1 and 2 comprises work parts 1 and 2, a shielding member 3 and clamping bars 4, 5 and 6 for holding the shield in position and for clamping the work parts to a supporting member 7. The supporting member 7 may form the top of a welding table, the body of a machine, or some other suitable work supporting means. The several parts are clamped to the supporting member through the agency of clamps 8. The welding electrode 9 is fed toward the work through the shield 3 by means illustrated in the drawing as an automatic arc welding head 10. Supporting member 7 may be provided with a backing or chill member 11 located immediately below the seam between the juxtaposed parts 1 and 2.

The shield 3 completes an enclosure within which the arc and molten portions of the work at the seam are enclosed. The shield serves to keep the surrounding atmosphere from the molten portions of the work during the welding operation and thus prevents the formation of compounds detrimental to the quality of the weld. The shield also serves to localize the heat of the arc and retard the rate of cooling of the weld metal. When the shield is provided with a fluxing material, or if made of some material such as paper which, when consumed in the heat of the arc, liberates a protective atmosphere, the weld metal is further protected by the slag deposit or surrounding gases formed during the welding operation.

The particular assembly, the shield, and the method of welding above described constitute the subject matter of the application of Gerald R. Brophy, Serial No. 479,717, filed concurrently herewith, for arc welding and assigned to the same assignee as the present application.

According to my invention a sheet of shielding material is fed in spaced relation to the arc and about the molten portions of the weld metal to form an assembly such as that shown in Figs. 1 and 2. In the particular embodiment shown in Fig. 3 the sheet of shielding material 12 is fed over a roller 13 through a funnel-shaped folding and guiding member 14, from which it emerges about the arcing terminal of the arc as a cylinder 15 spaced from the arc but totally enclosing the same. The shielding material 15 may be fed toward the work 1, 2 by means of suitably driven feed rolls 16. These rolls are illustrated as located in the lower cylindrical portion of the folding and guiding member 14 and mounted on shafts 17 upon which are also mounted worm wheels 18. These worm wheels are driven by worms 19 connected through a flexible drive shaft 20 with the shaft of one of the electrode feed rolls 21 of the welding head 10. The surfaces of the sheet feeding rolls 16 may be suitably roughened or serrated, in order to insure a positive engagement with the sheet of shielding material. The folding and guiding member 14, the feed rolls 16, and the transmission for driving the same are suitably supported on the nozzle 22 through which the welding electrode 9 is fed toward the work from the welding head 10. The joint between the nozzle 22 and member 14 completes the welding enclosure the side walls of which are formed by the tube of shielding material 15.

The method of operation is believed to be obvious from the construction described. Briefly it is as follows:—As the welding electrode 9 is fed toward the work by the welding head in accordance with its consumption in the arc, the feed rolls 16 connected with its feeding mechanism draw the sheet of shielding material 12 over the roller 13 and through the guiding and folding member 14 from which it emerges as a cylinder 15 spaced about the arc and immediately over the work parts 1, 2. The rate at which the shielding material is fed about the arc is such that its terminal portion is always in engagement with the work parts forming therewith an enclosure, the top of which is completed by the connection between the cylindrical portion of the member 14 and the nozzle 22 to which it is attached.

I prefer to use paper as a shielding material. The paper is preferably rendered non-inflammable by impregnating it with kaolin, sodium silicate, or like material. Suitable fluxing materials such as lime, calcium carbonate, titanium oxide, ferro-titanium and the like may also be applied to or incorporated in the paper. These materials may be in powdered form and held in position by the sodium silicate or similar material used for rendering the paper non-inflammable. In the presence of the arc a portion of the paper shield is burned, generating within the chamber formed by it an atmosphere of carbon monoxide and carbon dioxide, which shields the weld metal from the surrounding atmosphere and establishes an actively reducing medium in which the welding operation is performed. The clay, silicate or like material in the paper is precipitated on the weld metal as a slag which forms a covering for the exclusion of the surrounding atmosphere after the welding chamber has uncovered the weld metal. This slag will also delay the cooling of the weld metal and thus improve its texture. Welds produced under these conditions will be sound, ductile and of pleasing appearance.

In the embodiment of my invention shown in Fig. 4 the shielding material 23 is fed from a roll 24 through a folding member 25 into engagement with the work. The sheet 23 is folded so that its central portion is spaced from the work in order to form a chamber over the seam and about the arcing terminal of the electrode 9. The edges of the shield are held in engagement with the work by holding members 26 located on each side of the seam to be welded. These members may also serve to hold the work parts 1, 2 in adjusted position but generally it will be found preferable to provide separate clamping means for this purpose. The holding members 26 and the folding member 25 are supported from the welding head 10 by means of a bracket 27. The holding members comprise a plurality of rollers 28 mounted in frames 29 which are connected to the bracket 27 through springs 30. A fluxing material 31 may be applied to the shielding material 23 previous to passing it through the folding member 25. This may be a silicate for rendering the shield non-inflammable and fluxing the weld or some other fluxing material, such as powdered lime, calcium carbonate, titanium oxide, ferro-titanium and the like. These fluxes may be incorporated in the shielding material by the pressure exerted thereon when passing through the folding member 25, or they may be applied to the sheet of shielding material after the application of the sodium silicate above referred to which will then serve as a binder to hold them in place. In some cases they may be mixed with the sodium silicate and applied simultaneously therewith to the sheet of shielding material. In Fig. 4 the means for applying this material is illustrated as an atomizer having a container 32 for the fluxing material from which the material is ejected through a nozzle 33 against the sheet of shielding material 23 by air supplied through a conduit 34.

The apparatus shown in Fig. 4 produces a shield similar to that shown in Fig. 1. The method of operation is as follows:—As the welding head moves to the right over the seam to be welded sheet 23 is drawn from its roll 24 through the folding member 25 onto the work over the seam by holding members 26. These members hold the edge of the folded sheet in engagement with the work on each side of the seam while the electrode 9 cuts a slot through the folded part of the seam and performs through the arc at its terminal the desired welding operation. The arc is enclosed by the shield as is the molten metal about it. The slotted shield although partly destroyed still forms an effective covering about the welded seam. It retards cooling of the weld metal and seems to retain the protective gases generated about the arc in contact with the heated metal of the seam.

Instead of applying the fluxing material to the sheet of shielding material as illustrated in Fig. 4 the fluxing material may be applied to the sheet before it is coiled upon the supply roll 24. In Fig. 5, I have illustrated a roll of shielding material in which the sheet is made up of two sheets of material 35 and 36 within which is included a strip of fluxing material 37.

In accordance with my invention the shielding material through which the welding operation is performed may constitute only a part of the welding enclosure. For example, in the illustration shown in Fig. 6 the sheet of shielding material 38 may be fed into engagement with the upper surfaces of the work clamping members 39 to form the welding enclosure. In the particular construction illustrated the sheet 38 is held in position upon the clamping members 39 by means of a roller 40 and holding or pressure members 41 having a construction similar to those employed in the arrangement described in Fig. 4. The roller 40 and pressure members 41 are suitably supported by a bracket 42 which may be attached to the welding head or some other part of the welding machine having a fixed position relative to the welding head. In the construction shown in Fig. 6 the work parts 1 and 2 are held against the clamping members 39 by a flexible backing bar or strip 43 forced into engagement with the under side of the seam between the work parts by means of plungers 44 resting on a distensible fire-hose 45. By supplying a suitable fluid medium to the fire-hose, the plungers 44 are forced in an upward direction clamping the work parts between the clamping members 39 and the flexible backing bar 43 supported on these plungers. The welding operation is similar to that described in connection with Fig. 4, and in view of the illustration and description first given is believed to be readily apparent.

Instead of employing holding members such as illustrated at 26 and 41 in Figs. 4 and 6, holding members having the construction shown in Fig. 7 may be employed. The holding member illustrated in Fig. 7 comprises a frame 46 connected to a bracket 47, corresponding to the brackets 27 and 42 of Figs. 4 and 6, through the agency of a spring 48. In the particular arrangement illustrated spring members 49 are employed in place of the rolls used in Figs. 4 and 6 for holding the shielding member in engagement with the work or the work clamps. These springs are preferably placed close together as illustrated. Such a construction makes it possible to hold the shield against the work at more frequent intervals than when rolls are employed, and it is thus possible to secure a joint between the shield and the work which is more nearly gas tight. Other arrangements will suggest themselves to those skilled in the art. For example, an elongated spring supported shoe may be employed or a plurality of rolls and springs conjointly used to accomplish the desired result.

Apparatus in accordance with my invention is suitable for feeding a sheet of shielding material of any desired composition. Although I prefer to employ a sheet of treated paper as the shielding material other materials such as asbestos, impregnated cloth, and in some cases, even sheets of metal may be used. When paper is used the heat of the electrode combined with that of the welding arc enables the electrode readily to cut a slit through the shielding material when it is supplied as shown in Figs. 4 and 6. In some cases it may prove desirable or necessary to make the sheet of shielding material readily separable for the passage of the welding electrode therethrough by reducing its section, perforating it, slitting it, or the like. In some cases a suitable means for cutting or slitting the strip may be provided as part of the welding apparatus.

Various modifications and variations of my invention other than those illustrated and described will occur to those skilled in the art. Thus, while I have illustrated and described certain preferred embodiments of my invention, such modifications and variations are contemplated as fall within the true spirit and scope of my invention as set forth in the appended claims.

What I claim as new and desire to secure by Letters Patent of the United States is:

1. Welding apparatus comprising means for maintaining an arc, and means for feeding a sheet of shielding material in spaced relation to said arc to form an enclosure about it and the molten portions of the weld metal adjacent thereto.

2. Welding apparatus comprising means for maintaining an arc, means for folding a sheet of material into a shield about said arc, and means for feeding said sheet of material to said folding means.

3. Apparatus for use in welding wherein the welding operation is performed within an enclosure completed by a sheet of material, comprising means for feeding said sheet of material to complete said enclosure, and means for traversing an arcing electrode through said sheet along the work protected by said enclosure.

4. Apparatus for use in welding wherein the welding operation is performed within an enclosure completed by a sheet of material, comprising means for traversing a welding arc and a piece to be welded relatively to one another, and means responsive to said